United States Patent [19]
Vorrhees et al.

[11] 3,903,993
[45] Sept. 9, 1975

[54] HYDROSTATIC BEARING ARRANGEMENT FOR PRESS SLIDE

[75] Inventors: John E. Vorrhees, Sidney; Robert L. Schockman, St. Henry, both of Ohio

[73] Assignee: The Minster Machine Company, Minster, Ohio

[22] Filed: Mar. 26, 1973

[21] Appl. No.: 345,097

[52] U.S. Cl.................. 184/5; 184/100; 308/5 R
[51] Int. Cl.$^2$......................................... F16N 1/00
[58] Field of Search................ 184/5, 100; 308/5 R

[56] References Cited
UNITED STATES PATENTS

| | | | |
|---|---|---|---|
| 232,047 | 9/1880 | Marble | 308/5 R |
| 1,903,865 | 4/1933 | Johnson | 184/5 |
| 2,631,068 | 3/1953 | Saul | 184/5 |
| 3,109,514 | 11/1963 | Deflandre | 184/5 |
| 3,266,854 | 8/1966 | Aller | 308/5 R |
| 3,476,444 | 11/1969 | Dunfee | 308/5 R |
| 3,484,064 | 12/1969 | Koenig | 308/5 R |
| 3,508,430 | 4/1970 | Edmondson | 308/5 R |
| 3,512,848 | 5/1970 | Uhtenwoldt | 308/5 R |
| 3,583,774 | 6/1971 | DeGast | 184/5 |
| 3,711,167 | 1/1973 | Ennis | 308/5 R |

*Primary Examiner*—Charles J. Myhre
*Assistant Examiner*—Daniel J. O'Connor
*Attorney, Agent, or Firm*—Albert L. Jeffers; Roger M. Rickert

[57] ABSTRACT

A press slide which is reciprocably guided on the uprights of a press frame as by a gib structure is held in the proper position relative to the gibs by hydrostatic bearings interposed between the opposed surfaces of the gibs and the press slide. The hydrostatic bearings may be formed in the surfaces of the gibs which face the press slide or in the surfaces of the press slide which face the gibs. The hydrostatic bearings not only provide for highly accurate guiding of the press slide as it moves in reciprocation but resist deflection of the press slide due to unbalanced load imposed thereon and likewise substantially eliminate any wear of the opposed surfaces of the gibs and slide. The areas of the gib and slide surfaces outside the range of the hydrostatic bearings have an oil film therebetween which adds to the ability of the bearings to support dynamic loads.

17 Claims, 8 Drawing Figures

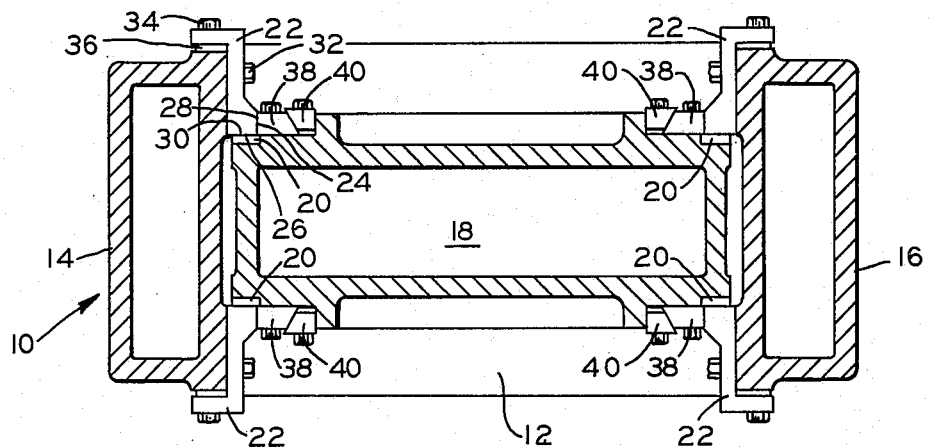
FIG. 1
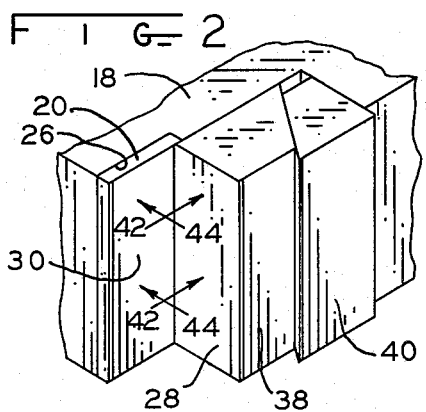
FIG. 2
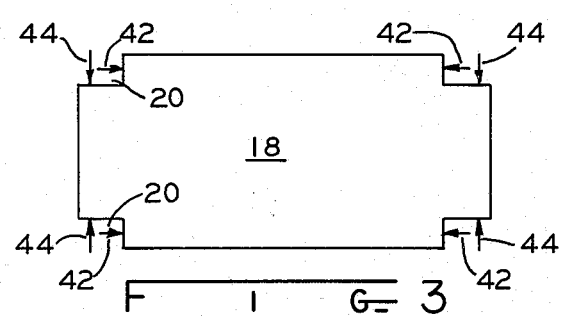
FIG. 3
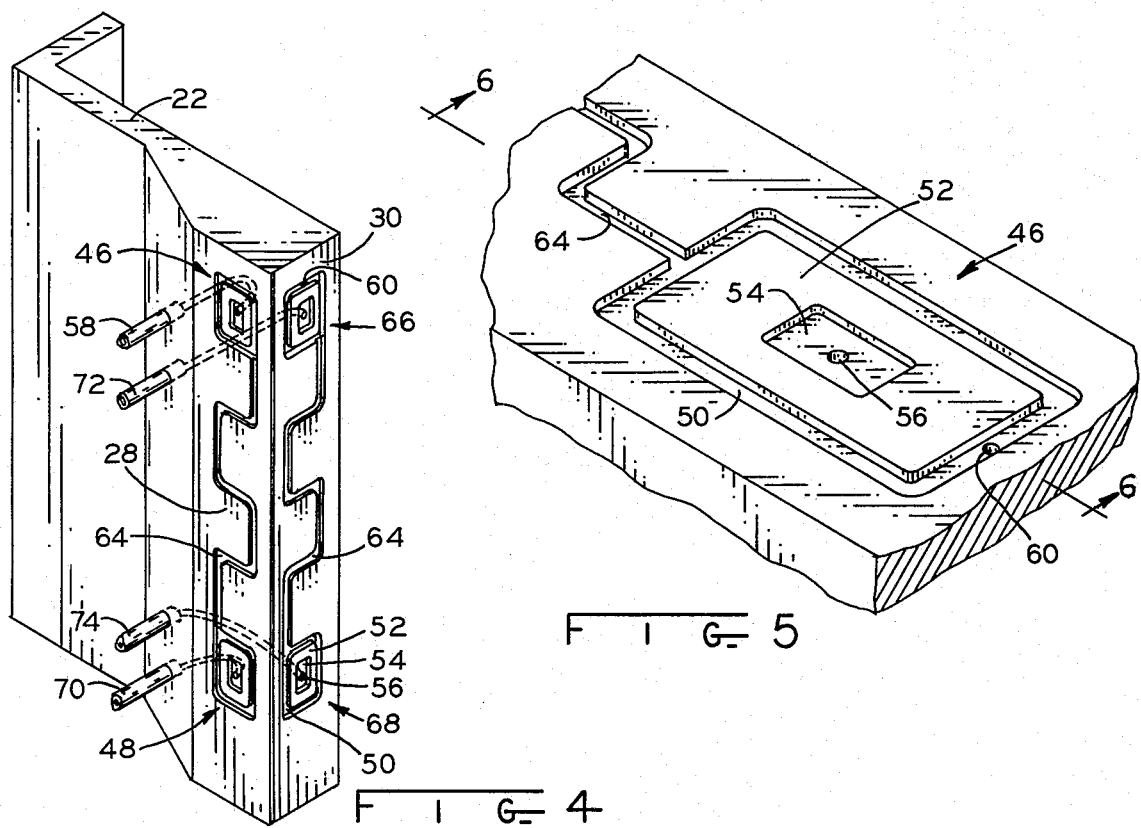
FIG. 4
FIG. 5

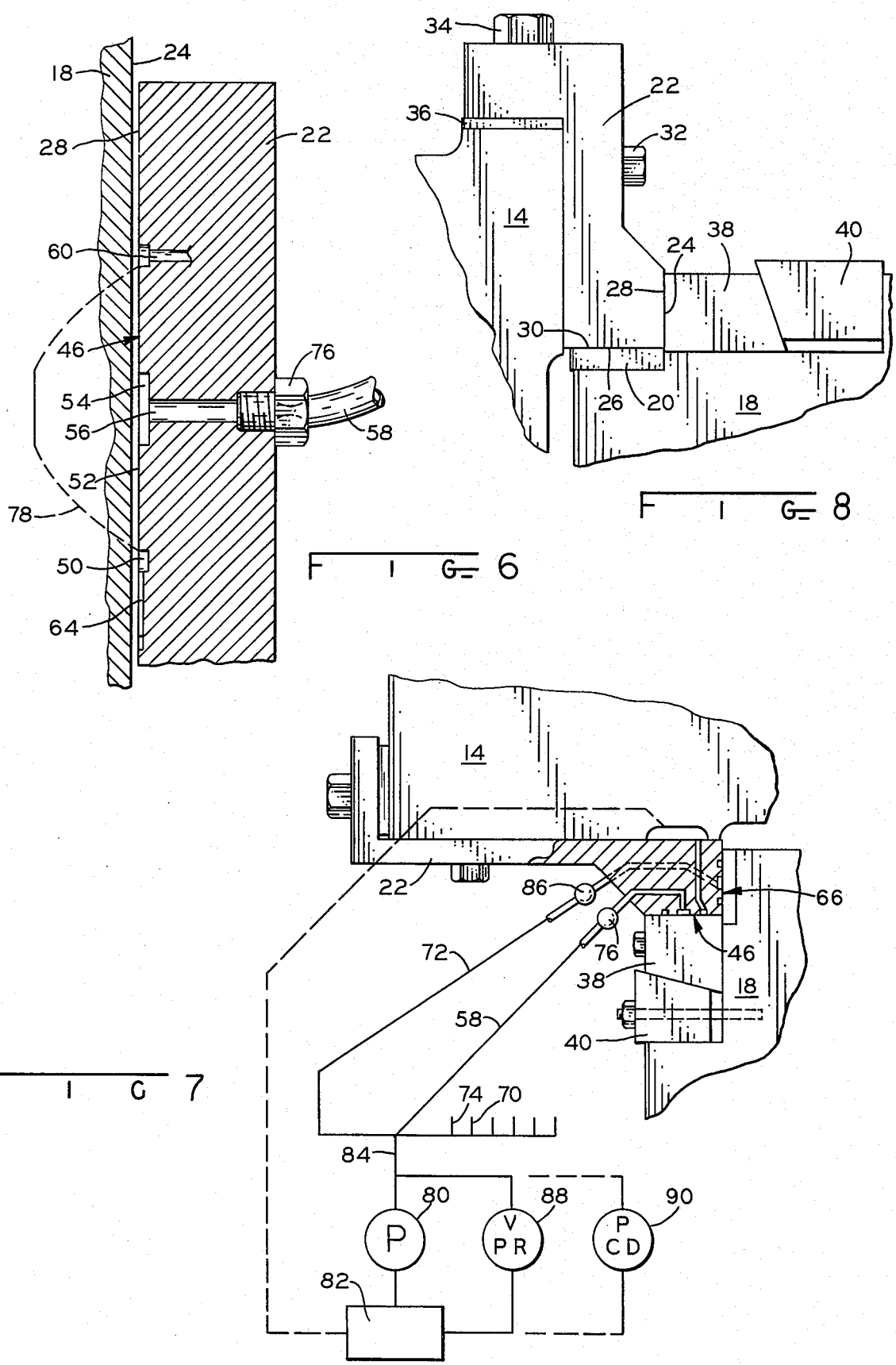

HYDROSTATIC BEARING ARRANGEMENT FOR PRESS SLIDE

The present invention relates to hydrostatic bearing arrangements for press slides and is particularly concerned with a hydrostatic bearing arrangement interposed between a press slide and the guiding surfaces on the stationary part of a press frame on which the press slide is guided during its reciprocating movement in the press frame.

Presses, both mechanical and hydraulic, are common machine tools in industry and are employed for a great variety of punching, piercing, stamping, blanking, forming, and like operations. The presses vary widely in size and capacity but substantially all have in common a press slide reciprocable toward and away from a press bed and guided during reciprocatory movement by guiding regions provided on the stationary press frame. The accurate guiding of a press slide during reciprocation thereof is highly important because if the parts of working tools mounted on the press bed and the press slide are not held in proper registration, improper workpieces are produced and damage to the tools can also result.

It is not always the case that tools of the aforesaid nature can be mounted in a press in such a manner as to prevent any non-uniform loading on the press slide and, when such loading occurs, a press slide may be subjected to rather large forces in the side to side or fore and aft directions tending to thrust the slide laterally in one direction or the other. In particular, off center loading of the press slide will tend to tilt the press slide about a horizontal axis. Under circumstances of this nature not only do the interengaging guide surfaces of the press slide and press frame wear excessively, but adjustment of the interengaging surfaces to hold the slide in the proper position at all times can become difficult.

Having the foregoing in mind, a primary object of the present invention is the provision of an improved guiding and bearing arrangement for guiding the slide of a press in a press frame during reciprocating movement of the press slide.

Another object of the present invention is the provision of an improved guiding and bearing arrangement of the nature referred to above which includes the provision of hydrostatic bearings interposed between the press slide and the press frame.

A still further object of the present invention is the provision of a substantially friction free hydrostatic bearing arrangement between a press slide and the stationary press frame in which it reciprocates which is extremely stiff, thereby inhibiting any lateral deflection, or tilting, of the press slide in the press frame.

BRIEF SUMMARY OF THE INVENTION

According to the present invention, a press slide is formed with corners and the press frame includes uprights having regions interfittingly engaging the corners of the press slide. Advantageously, for reasons of replacement and ease of assembly, there are secured to the press uprights, gib members which are fixed to the uprights and which engage the corners of the press slide. According to the modification of the invention illustrated in detail in the drawings, the surfaces of the gibs which are opposed to the corner surfaces of the slide are provided with hydrostatic bearing areas spaced along the gibs. These bearing areas are supplied with fluid under pressure and establish at least four hydrostatic bearing regions at each corner of the press. Each hydrostatic bearing region established by one gib is directly opposed to a hydrostatic bearing region formed by another gib so that the slide is supported from all sides at the same time.

As mentioned above, the hydrostatic bearing regions in each surface of each gib are spaced in the direction of travel of the slide and a groove is formed in the gib in the space interposed between the hydrostatic bearing areas so that a fluid film is maintained between the portion of the opposed surfaces of the gib and slide which are not confined within the hydrostatic bearing areas. The oil film thus established between each surface of the gibs and the opposed surfaces of the slide not only lubricate the slide as it reciprocates in the press frame, but also add substantial stiffness to the bearing arrangement tending substantially to eliminate lateral deflection, or tilting, of the slide even under condition of considerable off center loading.

Each hydrostatic bearing area is supplied with fluid at a predetermined substantially constant pressure, which may be derived from a source of adequate capacity via a respective restrictor, or each bearing area may be supplied with fluid at a predetermined constant rate of delivery. In either case, with no external load applied to the bearing, the fluid supply to each hydrostatic bearing area at the point that the fluid is so supplied is at a substantially constant pressure and is supplied at a substantially constant rate, while the region between any gib surface and the opposed surface of the slide lying outside the hydrostatic bearing areas is at substantially zero pressure even though a substantially continuous film of oil is maintained between each gib surface and the opposed slide surface outside the aforementioned hydrostatic bearing areas.

Throughout the specification and claims the term "press" will be used to refer to the various type of presses, headers and related metal forming machines employing a reciprocating slide or ram to carry out metal working operations.

An important factor influencing the accuracy of slide positioning in a press is the change in temperature that occurs in various parts of the press structure as a high speed press operates. This can change the clearances between the press slide and its guideway surfaces. The spring-like centering effect on the slide developed by opposed pairs of hydrostatic bearing areas will provide positive centering of the slide within the existing clearance space even though this clearance may change as a result of temperature effects.

It should be noted that the use of hydrostatic bearings for slide guiding confers a special advantage in the case of a machine in which the direction of slide motion is horizontal or inclined, rather than vertical. In such machines the static load support capability of the hydrostatic bearings can lift the slide out of contact with the lower guideway surfaces, against the force of gravity. It is also possible to use larger hydrostatic bearing areas on the lower side of the slide than on the upper side, so that the uplift force developed is greater than the downward preload force by the amount of the slide weight so that the slide may be precisely centered in its guides in the presence of gravity forces.

The foregoing objects as well as other objects and advantages of the present invention will become more apparent upon reference to the following detailed specification taken in connection with the accompanying drawings in which:

FIG. 1 is a schematic plan sectional view taken through the press frame, looking downwardly therein and showing a press slide in the frame guided at the corners thereof on the uprights of the press frame.

FIG. 2 is a schematic perspective view looking in at one corner of the press slide showing the distribution along the guiding surfaces of the press slide of the hydrostatic bearings according to the present invention.

FIG. 3 is a plan outline of the press slide, also showing the points about the press slide at which the hydrostatic bearings are located.

FIG. 4 is a perspective view, showing a typical gib mounted on an upright of the press frame and incorporating hydrostatic bearings for supporting the press slide at the corners thereof.

FIG. 5 is a partial perspective view drawn at enlarged scale, showing in more detail one of the hydrostatic bearing regions of the gib of FIG. 4.

FIG. 6 is a sectional view indicated by line 6—6 on FIG. 4, showing more in detail the location of one hydrostatic bearing area in the gib and the fluid connections leading to and from the said area and also showing schematically the general distribution of pressure across the hydrostatic bearing pad area.

FIG. 7 is a plan section at one corner of the press slide, showing in more detail the connection of the gib to the press upright and the engagement of the corner of the slide by the gib and the fluid connections for supplying fluid under pressure to the hydrostatic bearing areas of the gibs.

FIG. 8 is an enlarged view showing a corner of the press slide and the press frame adjacent thereto.

DETAILED DESCRIPTION OF THE INVENTION

Referring to the drawings somewhat more in detail, in FIG. 1, 10 generally indicates a press frame. The usual press frame comprises a bed portion 12 at the bottom and uprights 14 and 16 fixed to and upstanding from the bed portion, and a crown member fixed to the upper ends of the uprights. The crown member is not shown in FIG. 1

The crown member contains actuating devices for actuating a press slide in reciprocation between uprights 14 and 16 toward and away from bed 12. In FIG. 1, the press slide is indicated at 18 and it will be understood that working tools can be mounted in the space between slide 18 and bed 12, with one part operatively connected to the slide and another part operatively connected to the bed 12 whereby work operations such as are usually performed by a press can be accomplished.

In FIG. 1, and at enlarged scale in FIG. 8, the slide 18 according to the present invention will be seen to have slide wear plates 20 and gib wear plates 38 in the corners thereof. As will be seen in FIG. 8, each gib wear plate 38 has a fore and aft surface 24, and each slide wear plate 20 has a lateral surface 26 and each gib has a fore and aft surface 28 directly opposed to surface 24 of the slide and a lateral surface 30 which is directly opposed to surface 26 of the slide.

As is known in the press art, the press slide may include a slide wear plate 20 forming the surface 26, although for the purposes of the present invention the slide wear plate 20 must be so mounted that the surface thereof is not interrupted except in any region thereof which does not come within the range of a hydrostatic bearing land area during reciprocation of the press slide.

The gibs 22 are secured in the lateral direction by screws 32 extending into the pertaining press upright and in the fore and aft direction by screws 34 also extending into the uprights and with laminated washers 36 being interposed between the gibs and the pertaining uprights for adjustment of the gibs in the fore and aft direction of the press frame.

The surface 24 of each gib wear plate 38 is preferably adjustable in the lateral direction thereof as by the wedge member 40 also carried by the press slide.

As has been mentioned above, hydrostatic bearings are interposed between surfaces 24 and 28 and also between the surfaces 26 and 30. In the press illustrated, two hydrostatic bearing areas are interposed between each such pair of opposed surfaces.

For example, as seen in FIG. 2, hydrostatic bearing areas are located within the region of the arrows 42 and act in the lateral direction on the press slide, while other hydrostatic bearings are located within the region of the arrows 44 and act in the front to back direction on the press slide. Each of the corners of the press slide is provided with the same hydrostatic bearing arrangement so that it will be evident that there are eight pairs of hydrostatic bearings with the hydrostatic bearings of each pair being in opposed relation.

As shown in FIG. 3, which is a schematic plan outline view of press slide 18, the point of attack of each hydrostatic bearing on each wear plate is directly opposed to the point of attack of a hydrostatic bearing on another wear plate. For the sake of simplicity, the arrows indicating the points of attack of the hydrostatic bearings on the slide 18 in FIG. 3 have affixed thereto the same reference numerals employed for this purpose in FIG. 2.

FIGS. 4, 5 and 6 show more in detail the exact arrangement of the aforementioned hydrostatic bearings. FIG. 4 is a perspective view of a gib 22 and shows the surfaces 28 and 30 thereof. Each surface is finished smooth and flat and has formed therein hydrostatic bearing areas generally indicated at 46, 48, 66 and 68. Each hydrostatic bearing area is formed with an outer endless groove 50, which defines a pad area 52 inwardly of the groove with the center of the pad area being formed with a recess 54 to which fluid under pressure is supplied by way of a port 56. Port 56 pertaining to hydrostatic bearing region 46, for example, is connected by passage means drilled in the gib with a conduit 58 leading from a source of pressure.

Groove 50 is also interrupted by a port 60 leading through the gib to a drainage region which may be formed by a groove in the adjacent press upright.

Between hydrostatic bearing areas 46 and 48 there is a substantial length of the planar surface 28 and means are provided for maintaining an oil film over the entire area of surface 28 which lies outside the hydrostatic bearing areas by connecting groove 50 of hydrostatic bearing area 46 with the corresponding groove 50 of hydrostatic bearing area 48 by a zig-zag groove 64 formed in surface 28 of the gib. Groove 50 of bearing area 48 also communicates via a port with a drain region.

As will be seen in FIG. 4, each of surfaces 28 and 30 are provided with substantially identical groove arrangements so that no specific description of the bearing areas, grooves and the like in surface 30 is given. The hydrostatic bearing areas in surface 30 are identified generally by reference numerals 66 and 68. According to the present invention, each of the hydrostatic bearing areas has an independent supply of fluid thereto, with conduit 58, as aforementioned, supplying hydrostatic bearing area 46, conduit 70 supplying hydrostatic bearing area 48, conduit 72 supplying hydrostatic bearing area 66 and conduit 74 supplying hydrostatic bearing area 68.

A somewhat detailed showing of a typical hydrostatic bearing area, namely, area 46, is shown in perspective in FIG. 5.

FIG. 6 shows further details in respect of a hydrostatic bearing area and, for the purposes of description, is the hydrostatic bearing area indicated at 46 in FIG. 4.

In FIG. 6, it will be noted that there is a substantially uniform gap of about 0.0012 inches between the surface 28 of the gib 22 and the opposed surface 24 of press slide 18. FIG. 6 will also show that conduit 58 is connected with recess 54 in the hydrostatic bearing pad 52 via a restrictor 76. In practice, it has been found that a supply of fluid pressure at about 300 pounds per square inch in conduit 58 can advantageously be reduced to a pressure of about 200 pounds per square inch in recess 54. This fluid will flow outwardly between surfaces 24 and 28 over pad 52 to groove 50 and which groove is at zero pounds per square inch. The variation in pressure across the bearing pad 52 from recess 54 to groove 50 is somewhat schematically indicated by the dashed line 78 to the left side of FIG. 6, wherein it will be seen the pressure acting on the bearing pad 52 diminishes from a maximum of 200 PSI at recess 54 to zero PSI at groove 50.

FIG. 6 also shows the port 60 communicating with groove 50 and which leads to a point of drain and, similarly, shows one end of zig-zag groove 64 by means of which an oil film is maintained between surface 28 of the gib and surface 24 of the slide outside the range of the hydrostatic bearings.

FIG. 7 illustrates the fluid connections to the hydrostatic bearings and can be considered to be a section taken through the gib of FIG. 4 at the level of hydrostatic bearing areas 46 and 66. In FIG. 7, a pump 80 is provided which draws fluid from a reservoir 82 and which supplies fluid to a main distribution conduit 84. The main conduit 84 is connected to branch conduit 58 which, as mentioned, leads through restrictor 76 to the recess 54 pertaining to hydrostatic bearing 46. A conduit 72, which leads through a respective restrictor 86 to the central recess pertaining to hydrostatic bearing 66, is also connected to main conduit 84. Conduits 74 and 70, referred to in FIG. 4, are also connected to main conduit 84. Main conduit 84 has a plurality of other supply conduits leading therefrom through respective restrictors to the central areas of the hydrostatic bearings pertaining to the press slide. For the particular hydrostatic bearing arrangement illustrated, wherein there are four hydrostatic bearings at each corner of the press slide, there are sixteen supply conduits branching off from main conduit 84.

In FIG. 7, pump 80 is bypassed by a pressure relief valve 88 but it is also conceivable that pump 80 could be replaced by the constant delivery pump 90 schematically illustrated at the right side of FIG. 7.

Assuming that all of the hydrostatic bearings are energized, namely, supplied with fluid at a predetermined rate and at a predetermined pressure, if a steady lateral load is applied to the slide the film thickness on one side of the slide will gradually decrease, while the film thickness on the other side of the slide will gradually increase. The pressure over the hydrostatic bearing pad areas on the side where the film is decreasing will increase because the size of the gap between the pertaining opposed surfaces of the gib and slide will decrease, while on the other side the said pressure will decrease because the size of the corresponding gap will increase.

The resulting pressure differential between the opposed hydrostatic bearing pads on the opposite sides of the press slide will support a steady lateral load supplied to the slide in the described manner. When the load is released, the pressure differential will force the slide back to its centered position and the pressures in the hydrostatic bearing pad areas will return to normal values.

A typical hydrostatic bearing pad for slide guiding has a stiffness of about 500,000 pounds per inch. Thus, with eight pads acting in the front to back direction and eight more pads acting in the lateral direction, the stiffness of slide support in any direction in the horizontal plane is about 4 million pounds per inch. The centering action on the slide obtained by the opposed hydrostatic bearing areas thus has the effect of a preloaded bearing system but is substantially friction free and free of wear. Increasing the oil supply pressure or the pad area, or reducing the bearing clearance, all have the effect of increasing bearing stiffness.

Due to the action of the hydrostatic bearings described above, the press slide will be precisely centered within the clearance space therefor on each stroke of the press prior to contact between the parts of the working tool mounted on the press slide and the press bed.

The rather liberal supply of high pressure oil to the hydrostatic bearing areas will also maintain the clearance space between the opposed surfaces of the gibs and slide filled with oil. This film of oil, which is referred to as a "squeeze film" is important for adding stiffness to the support provided for the slide in resisting dynamic loads.

For example, when the slide is subject to an off center load, there is a tendency for the slide to tilt in the press frame. This tilting, or rotation, of the slide about a horizontal axis will be opposed not only by the stiffness of the hydrostatic bearings themselves located at the upper and lower regions along the gibs, but also by the squeeze film action developed between the opposed surfaces of the gibs and the slide as the corners of the slide attempt to move toward the gibs.

Extremely high pressures must be produced in the squeeze film to cause the oil to flow outwardly through the narrow clearance space before the slide can be caused to approach the gib. The oil must flow outwardly from the clearance space rather than being compressed therein and a significant time is, therefore, required to produce such outflow of oil to permit any significant amount of movement of the slide toward any of the gibs. The squeeze film action thus limits the rate at which tilting of the slide can occur. The squeeze film action similarly inhibits any sudden lateral movement of the press slide.

In the normal course of events, any tilting moment exerted on the slide due to off-center loading is applied to the slide for only a brief time, usually only a small fraction of a second, so that the tilting resistance offered by the squeeze film powerfully resists slide tilting and reinforces and increases the inherent high stiffness of the hydrostatic bearings. The described combination of hydrostatic bearing regions and the squeeze film gib bearings above described substantially positively prevents tilting motion of the slide during working operations while even more positive centering of the slide in its clearance space is obtained between successive loadings applied to the press slide.

The advantages offered by the combination described herein are summarized as follows:

1. The press slide is substantially positively centered under a preload.
2. Metal-to-metal contact between the press slide and the gibs is avoided and, accordingly, substantially zero wear occurs of the guiding surfaces on the slide and the gibs.
3. The press slide is positively centered under static conditions thereby substantially aiding in the setting of dies and similar tools in the press.
4. Substantially positive slide centering obtains during work operations thereby yielding optimum tool performance and greatly reducing the hazard of damaging tools.
5. Minimum lateral slide deflection or tilting even under condition of substantial off-center working loads.

Modifications may be made within the scope of the appended claims.

What is claimed is:

1. In a press having a press frame and a slide reciprocable in the frame; guiding surface means formed on said slide and press frame parallel to the direction of reciprocation of the slide in the press frame, said guiding surface means comprising closely spaced equivalent pairs of parallel planar surfaces in opposed forced balancing relation one pair to another with one surface of each pair on the press frame and the other surface of each pair on the press slide, each said pair of surfaces having at least one hydrostatic bearing area operatively interposed therebetween, adjusting means for controlling the clearance space between said opposed planar surfaces, means for supplying fluid under pressure to said hydrostatic bearing areas, and means for maintaining a fluid squeeze film between the said surfaces of each pair of surfaces outside the range of said hydrostatic bearing areas.

2. A press according to claim 1 in which said means for maintaining a fluid film between each pair of opposed surfaces comprises groove means formed in at least one of said surfaces and continuously communicating with a said hydrostatic bearing area.

3. A press according to claim 1 which includes gib members fixedly mounted on said press frame and having wear plates carried on said slide, one surface of each pair of surfaces being formed on a respective gib member.

4. A press according to claim 3 in which the hydrostatic bearing areas are disposed in the wear plates.

5. A press according to claim 1 in which said slide is substantially rectangular when viewed in plan and has two angularly related surfaces formed thereon at each corner thereof, gib members fixed to said press frame and having portions extending into adjacent relation to said angularly related surfaces, each said portion having two angularly related surfaces thereon each of which forms a said pair of surfaces with one of the said angularly related surfaces on the pertaining corner of the slide.

6. A press according to claim 5 in which all of said hydrostatic bearing areas are formed in the said surfaces of said gib members.

7. A press according to claim 1 in which said means for supplying fluid is a substantially constant pressure source.

8. A press according to claim 1 in which said means for supplying fluid is a substantially constant delivery source.

9. A press according to claim 1 in which each said pair of surfaces has at least two hydrostatic bearing areas therebetween spaced in the direction of reciprocation of the slide, the hydrostatic bearing areas pertaining to each pair of surfaces comprise a pair of endless grooves formed in one of said surfaces in spaced relation and each defining a bearing pad inside the respective groove, a port in each bearing pad, said means for supplying fluid to said hydrostatic bearing areas comprising a source of fluid under pressure, and a respective conduit connecting said source to each said port.

10. A press according to claim 9 in which said means for maintaining a fluid film between the surfaces of each pair of surfaces comprises groove means formed in said one surface and connected at the ends to the said grooves.

11. A press according to claim 10 in which said groove means follows a zig-zag path from one said groove to the other.

12. A press according to claim 1 wherein the fluid in said hydrostatic bearing areas compensates for the change in clearance between the press slide and guiding surface means caused by increase or decrease of temperature in said press slide and guiding surface means thereby providing positive centering of the press slide within said guiding surface means during operation of the press.

13. A press according to claim 1 wherein said reciprocable slide travels in a non-vertical direction.

14. A press according to claim 13 wherein the hydrostatic bearing areas that support a portion of the dead weight of said slide are made larger than said opposed hydrostatic bearing areas by an amount sufficient to maintain said slide centered between said guiding surfaces.

15. A press according to claim 1 wherein the adjusting means includes at least one wedge member.

16. The method of guiding a press slide reciprocation in a press frame which comprises forming pairs of opposed closely spaced surfaces on said slide and frame respectively parallel to each other in opposed forced balancing relation one pair to another and parallel to the direction of movement of the slide and elongated in said direction, supplying fluid through a restrictor from a source at a given pressure to each of at least one point of one of said surfaces, connecting a region which extends in a closed narrow path spaced from and surrounding said point to drain, maintaining a squeeze film of fluid between said surfaces outside the area confined inside said region, and adjusting the clearance space between said opposed planar surfaces.

17. The method according to claim 16 in which said fluid is supplied at a predetermined rate of flow.

* * * * *

UNITED STATES PATENT OFFICE
CERTIFICATE OF CORRECTION

PATENT NO. : 3,903,993
DATED : September 9, 1975
INVENTOR(S) : John E. Voorhees and Robert L. Schockman It is certified that error appears in the above-identified patent and that said Letters Patent are hereby corrected as shown below:

Col. 8, line 52 (Claim 16) "reciprocation" should be

--- reciprocating ---.

Signed and Sealed this second Day of December 1975

[SEAL]

Attest:

RUTH C. MASON
*Attesting Officer*

C. MARSHALL DANN
*Commissioner of Patents and Trademarks*